US008955986B2

(12) United States Patent
Park

(10) Patent No.: US 8,955,986 B2
(45) Date of Patent: Feb. 17, 2015

(54) PROJECTION SYSTEM, LIGHTING DEVICE AND METHOD FOR CONTROLLING THEREOF

(75) Inventor: Tae Bong Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 338 days.

(21) Appl. No.: 13/343,260

(22) Filed: Jan. 4, 2012

(65) Prior Publication Data

US 2012/0170004 A1    Jul. 5, 2012

(30) Foreign Application Priority Data

Jan. 4, 2011    (KR) .......................... 10-2011-0000381

(51) Int. Cl.
*G03B 21/20* (2006.01)
*G03B 21/16* (2006.01)
*G03B 21/18* (2006.01)
*H05B 33/08* (2006.01)

(52) U.S. Cl.
CPC ............ *H05B 33/0869* (2013.01); *G03B 21/16* (2013.01); *G03B 21/2033* (2013.01); *G03B 21/2086* (2013.01); *H05B 33/0866* (2013.01); *Y10S 362/80* (2013.01)
USPC .................. 353/85; 353/52; 353/94; 362/800

(58) Field of Classification Search
CPC ........... G03B 21/2033; G03B 21/2053; H04N 9/3164; H04N 9/3194; G09G 2320/041
USPC ......... 353/85, 52, 94; 362/800; 315/291, 294, 315/297, 309
See application file for complete search history.

(56) References Cited

U.S. PATENT DOCUMENTS

| 7,119,500 | B2 * | 10/2006 | Young ........................... 315/294 |
| 7,156,522 | B2 * | 1/2007 | Plut ................................ 353/31 |
| 2006/0203204 | A1 * | 9/2006 | Yu ................................... 353/52 |
| 2006/0238720 | A1 * | 10/2006 | Lee et al. ........................ 353/38 |
| 2007/0103646 | A1 * | 5/2007 | Young ........................... 353/52 |
| 2008/0297737 | A1 * | 12/2008 | Igarashi ......................... 353/85 |

* cited by examiner

*Primary Examiner* — William C. Dowling
*Assistant Examiner* — Ryan Howard
(74) *Attorney, Agent, or Firm* — Saliwanchik, Lloyd & Eisenschenk

(57) ABSTRACT

Provided are a projection system, a lighting device, and a method for controlling thereof. The projection system includes: a light source unit including a first light source and a second source for projecting a first color corresponding to that of the first light source; a sensing unit for measuring a temperature of each of the first and second light sources; and a driver IC for driving at least one of the first light source and the second light source according to a temperature value measured by the sensing unit.

9 Claims, 5 Drawing Sheets

PROJECTION SYSTEM, LIGHTING DEVICE AND METHOD FOR CONTROLLING THEREOF

CROSS-REFERENCE TO RELATED APPLICATION

This application claims the benefit under 35 U.S.C. §119 of Korean Patent Application No. 10-2011-0000381, filed Jan. 4, 2011, which is hereby incorporated by reference in its entirety.

BACKGROUND

The present disclosure relates to a projection system, a lighting device, and a method for controlling thereof.

In general, a projection system loads an image signal into the light emitted from a light emitting device and projects it on the front or rear of a screen, to allow a viewer to watch a projected image. The projection system may include a Cathode-Ray Tube (CRT) type, a digital micro mirror device type, a reflective liquid crystal panel type, and a transmissive liquid crystal panel type.

However, a typical projection system includes red, green, and blue light sources, whose brightness may be deteriorated when their on-states are maintained for a long time. Referring to FIG. 1, especially, the red light source among the red, green, and blue light sources has severe brightness degradation due to heat. The brightness difference between the red, green, and blue light sources cause the white imbalance of an entire image so that the image quality of the projection system is deteriorated.

BRIEF SUMMARY

Embodiments provide a projection system for inhibiting image quality deterioration.

In one embodiment, a projection system includes: a light source unit including a first light source and a second source for projecting a first color corresponding to that of the first light source; a sensing unit for measuring a temperature of each of the first and second light sources; and a driver IC for driving at least one of the first light source and the second light source according to a temperature value measured by the sensing unit.

In another embodiment, a lighting device includes: a first light source for projecting first color; a second light source for projecting a first color corresponding to that of the first light source; a third light source for projecting a second color; and a fourth light source for projecting a third color, wherein the first and second light sources are selectively driven on the basis of the brightness of the first color projected from the first and second light sources.

In further another embodiment, a method of controlling a lighting device includes: turning on one of first and a second light sources for projecting a predetermined color light; measuring a temperature of the turned-on light source; turning off the turned-on light source when a temperature of the turned-on light source increases above a predetermined value; and turning on the other light source for projecting the same color light as the turned-on light source, wherein the turning on of the one of the first and second light sources, the measuring of the temperature, the turning off of the turned-on light source, and the turning on of the other light source are repeated.

The details of one or more embodiments are set forth in the accompanying drawings and the description below. Other features will be apparent from the description and drawings, and from the claims.

DETAILED DESCRIPTION

Reference will now be made in detail to the embodiments of the present disclosure, examples of which are illustrated in the accompanying drawings.

In the description of embodiments, it will be understood that when a panel, line, cell, device, surface, or pattern is referred to as being 'on' or 'under' another panel, line, cell, device, surface, or pattern, the terminology of 'on' and 'under' includes both the meanings of 'directly' and 'indirectly'. Further, the reference about 'on' and 'under' each component will be made on the basis of drawings. In addition, the sizes of elements and the relative sizes between elements may be exaggerated for further understanding of the present disclosure.

Figure 1:
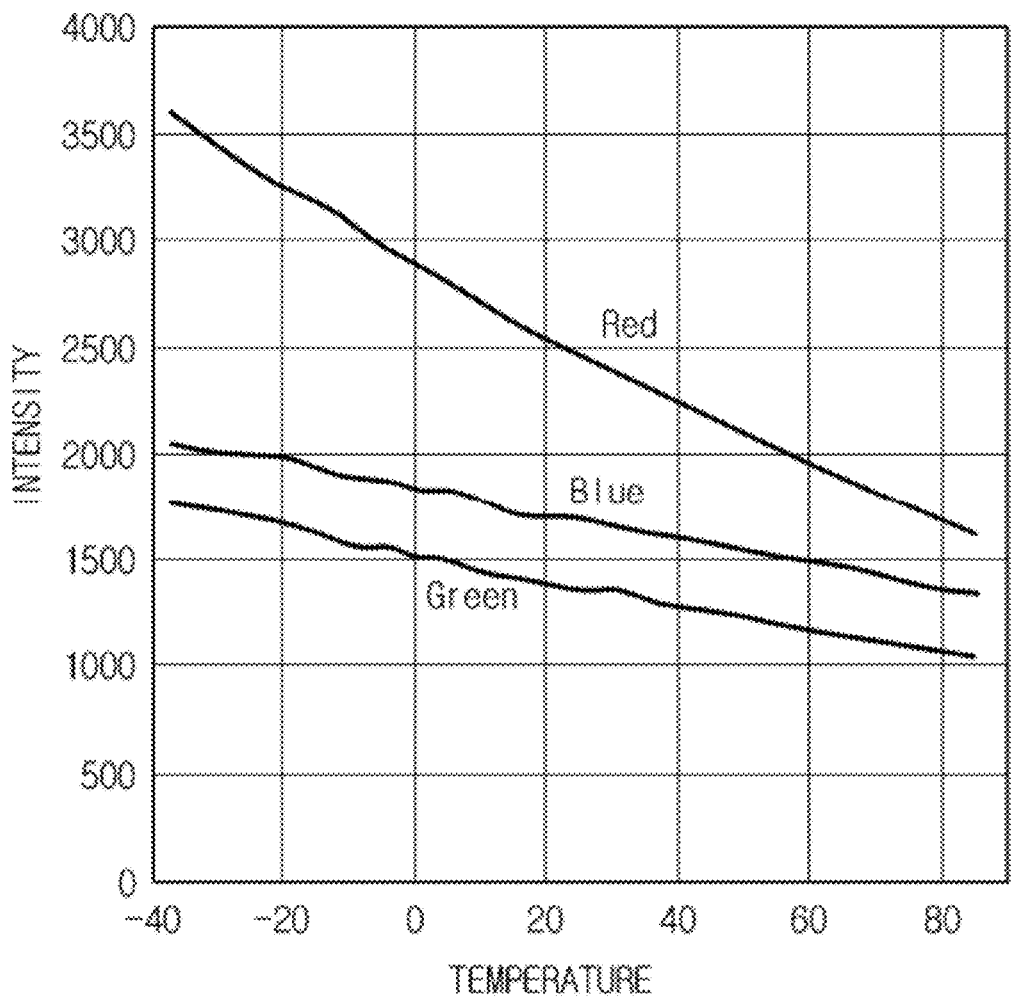
FIG. 1 is a graph illustrating a brightness change according to a temperature of each color LED.
Figure 2:
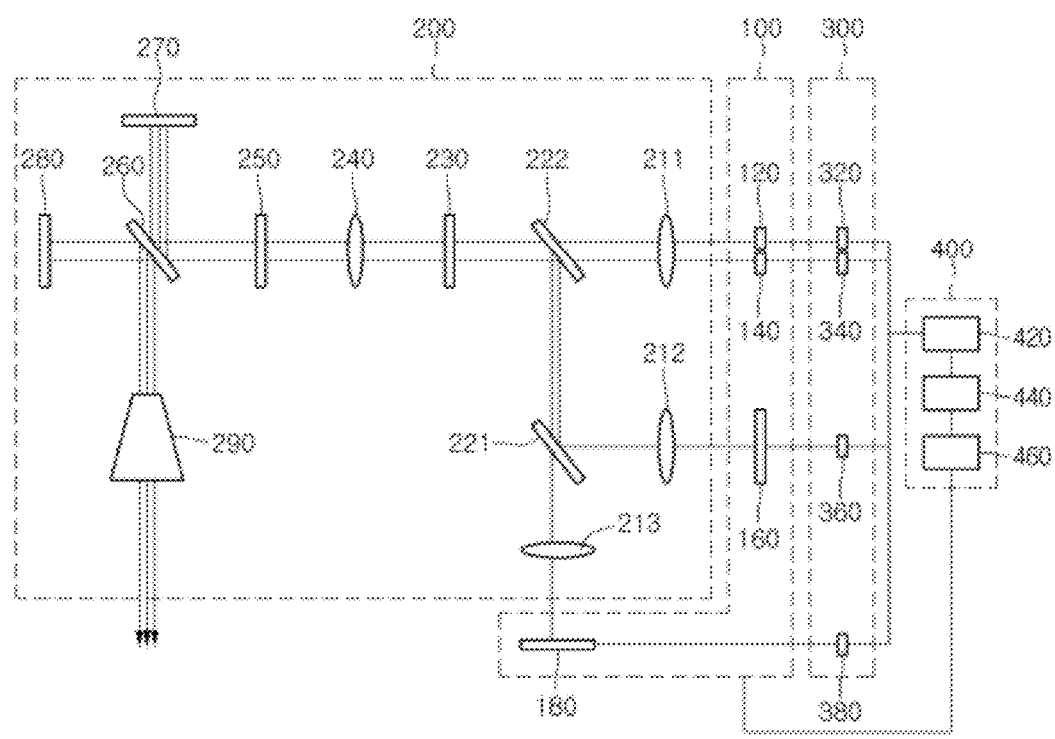
FIG. 2 is a block diagram illustrating a projection system according to an embodiment.
Figure 3:
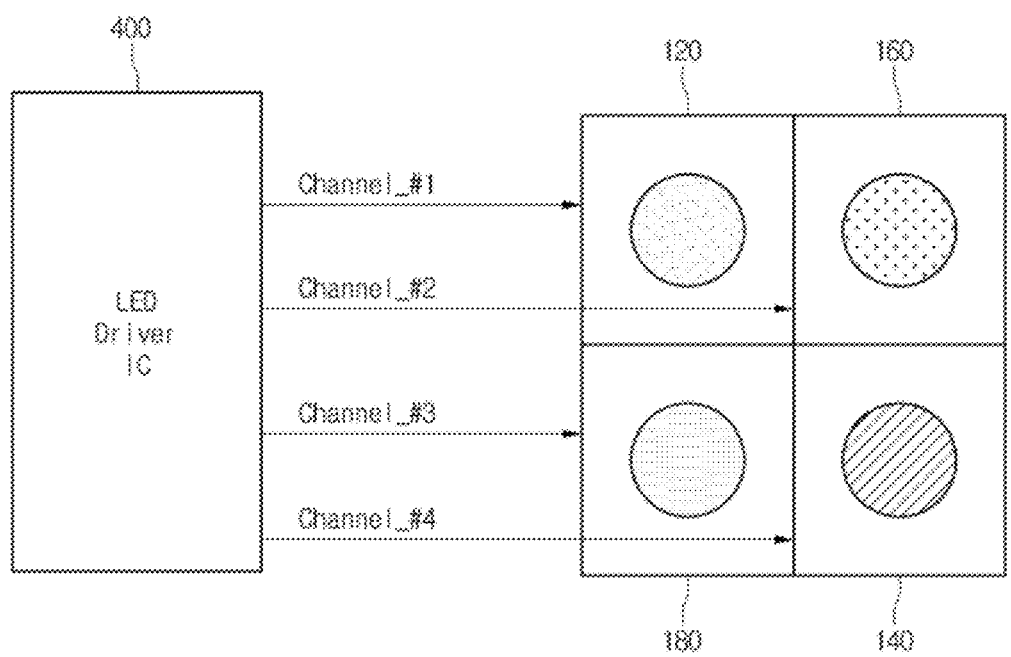
FIG. 3 is a view of a light source unit according to an embodiment.

FIG. 2 is a block diagram illustrating a projection system according to the present invention. FIG. 3 is a block diagram illustrating a relationship between operations of a light source unit and a driving driver constituting the projection system according to the present invention.

Referring to FIG. 2, the projection system includes a light source unit 100 having first to fourth light sources 120, 140, 160, and 180, an image generating unit 200 for generating a projected image through an image signal of color projected from the light source unit 100, a temperature sensing unit 300 for measuring a temperature of the first to fourth light sources 120, 140, 160, and 180, and a driver IC 400 for selectively driving the first to fourth light sources 120, 140, 160, and 180 according to a temperature value measured by the temperature sensing unit 300.

Referring to FIG. 3, the light source unit 100 may include an array having four light emitting diodes projecting at least red, green, blue, and red lights. That is, when the red, green, and blue diodes are allocated in a 2*2 diode matrix array, there is an extra diode space, and thus, the red diode 140 may be further disposed therein. That is, the red diode 140 may be provided twice than other color diodes. The light source unit 100 projects red, green, and blue lights and the projected lights are provided to the image generating unit 200. For this, the light source unit 100 includes the first to fourth light emitting diodes 120, 140, 160, and 180 for projecting read, green, and blue colors, respectively. There are the four light emitting diodes 120, 140, 160, and 180 in FIG. 2. Moreover, the projection system of the present invention has a plurality of the light source units 100, each having the four light emitting diodes 120, 140, 160, and 180. The first light emitting diode 120 is a red light emitting diode for emitting red light and the second light emitting diode 140 is also a red light emitting diode for emitting a corresponding red light to that of the first light emitting diode 120.

The second light emitting diode 140 emits the same red light as the first light emitting diode 120 and may be additionally provided besides the first light emitting diode 120 to compensate for its weakness to heat. Therefore, the first light emitting diode 120 and the second light emitting diode 140 may be alternately or simultaneously driven, in order to compensate for their weakness to heat. This control structure will be described in more detail later.

The third light emitting diode 160 is a green light emitting diode for emitting green light and the fourth light emitting diode 180 is a blue light emitting diode for emitting blue light. They are interchangeable.

Moreover, the light source unit 100 includes the light emitting diodes for emitting red, green, and blue lights herein, but is not limited thereto. Thus, it is apparent that various light sources such as a fluorescent lamp bedside the light emitting diode may be used.

The image generating unit 200 includes first to third collimating lens 211, 212, and 213, first and second dichroic mirrors 211 and 222, a fly eye lens (FEL) 230, a relay lens 240, a polarizing plate 250, a polarizing beam splitter (PBS) 260, an optical sensor 270, a liquid crystal panel 280, and a projecting lens system 290.

The first collimating lens 211 is disposed corresponding to the first light emitting diode 310 and the second light emitting diode 320. Additionally, the first collimating lens 211 concentrate the lights projected from the first light emitting diode 120 and the second light emitting diode 140.

The second and third collimating lenses 212 and 213 are disposed corresponding to the third light emitting diode 160 and the fourth light emitting diode 180. The second and third collimating lenses 212 and 213 concentrate the lights projected from the third light emitting diode 160 and the fourth light emitting diode 180.

The first dichroic mirror 221 selectively reflects or transmits the light concentrated by the second and third collimating lenses 212 and 213.

The second dichroic mirror 222 selectively reflects or transmits the light reflected by or transmitted from the first dichroic mirror 221 and the lights concentrated by the first collimating lens 211 to project the reflected or transmitted light to the FEL 230.

The FEL 230 uniformly projects the light incident from the second dichroic mirror 222. That is, the FEL 230 projects the incident light to have uniform brightness over an entire projecting surface.

The relay lens 240 serves to concentrate the light incident from the FEL 230.

The polarizing plate 250 converts the light incident from the relay lens 240 into P polarized light and S polarized light and projects them. The polarizing plate 250 converts most of the light into the P polarized light.

The PBS 260 transmits the P polarized light and reflects the S polarized light among the incident light. Accordingly, the P polarized light converted by the polarizing plate 250 penetrates the PBS 260 and then is incident to the liquid crystal panel 280.

The optical sensor 270 is disposed corresponding to the PBS 260. The optical sensor 270 senses the S polarized light reflected from the PBS 260. The optical sensor 270 converts the intensity of the S polarized light, reflected from the PBS 260, into an electrical signal and then delivers it to the system 600.

The optical sensor 270 may include a photodiode or a phototransistor, for example. Additionally, the optical sensor 270 may include a Complementary Metal-Oxide Semiconductor (CMOS) image sensor.

The optical sensor 270 may sense a flickering phenomenon that an image flickers. Additionally, the optical sensor 270 may sense whether the first to fourth light emitting diodes 120, 140, 160, and 180 and the liquid crystal panel 280 are synchronized. Additionally, the optical sensor 270 may include various sensors.

The liquid crystal panel 280 converts the P polarized light penetrating the PBS 260 into the S polarized light, and selectively reflects it according to a pre-inputted image signal. The liquid crystal panel 280 may be a Liquid Crystal on Silicon (LCoS) panel. Accordingly, the light reflected from the liquid crystal panel 280 is a selectively reflected S polarized light.

The S polarized light selectively, reflected by the liquid crystal panel 280, is reflected by the PBS 260 and is incident to the projecting lens system 290.

The projecting lens system 290 enlarges the light reflected by the liquid crystal panel 280 and then projects the enlarged light on a screen.

Thereby, the image generating unit 200 uses the lights projected from the first to fourth light emitting diodes 310, 320, 330, and 340 to project an image sequentially. That is, the image generating unit 200 sequentially projects red, green, and blue images.

Moreover, the temperature sensing unit 300 is disposed at one side of the light source unit 100. The temperature sensing unit 300 measures each temperature of the first light emitting diode 120, the second light emitting diode 140, the third light emitting diode 160, and the fourth light emitting diode 180.

For this, the temperature sensing unit 300 includes a first temperature sensor 320 at one side of the first light emitting diode 120, a second temperature sensor 340 at one side of the second light emitting diode 140, a third temperature sensor 360 at one side of the third light emitting diode 160, and a fourth temperature sensor 380 at one side of the fourth light emitting diode 180.

The installation positions of the first temperature sensor 320, the second temperature sensor 340, the third temperature sensor 360, and the fourth temperature sensor 380, installed at the respective first to fourth light emitting diodes 120, 140, 160, and 180, may be disposed on a printed circuit board (not shown) for supplying power.

In the above, the temperature sensing unit 300 is installed at the first to fourth light emitting diodes 120, 140, 160, and 180, but is not limited thereto. That is, the temperature sensing unit 300 may be installed at only the first and second light emitting diodes 120 and 140, and its installation position may vary if necessary.

The driver IC 400, which controls the power of the first to fourth light emitting diodes 120, 140, 160, and 180 according to values measured by the temperature sensing unit 300, is disposed at one side of the temperature sensing unit 300.

Especially, the driver IC 400 selectively drives the first and second light emitting diodes 120 and 130 for projecting red lights according to their temperature measurement value.

For this, the driver IC 400 includes an A/D converter 420 for converting a temperature value measured from the temperature measuring unit 300 into digital information, and the control unit 440 is connected to the A/D converter 420. Accordingly, the control unit 440 may receive the temperature measurement values of the first and second light emitting diodes 120 and 140 from the A/D converter 420.

As mentioned above, when receiving the temperature measurement values of the first and second light emitting diodes 120 and 140 for projecting red lights, the control unit 440 may perform controlling to selectively control the first and second light emitting diodes 120 and 140 according to their temperature measurement values.

Here, the driving unit 460, which supplies power to the first and second light emitting diodes 120 and 140, may be further connected to the control unit 440, and thus, the control unit 440 may simultaneously or separately drive the first and second light emitting diodes 120 and 140 when providing a signal to the driving unit 460.

Moreover, the present invention may be applied to the projection system of FIG. 2, and also, a lighting device including a part or all of components constituting the projection system of FIG. 2.

Moreover, there is no restriction on configurations and relationships between each component of the projection system shown in FIGS. 2 and 3. An arrangement relationship between the light emitting diodes of FIG. 3 is exemplarily so that their relative positions may vary.

Hereinafter, referring to FIGS. 4 and 5, operations for selectively driving the first and second light emitting diodes 120 and 140 will be described in more detail.

Figure 4:
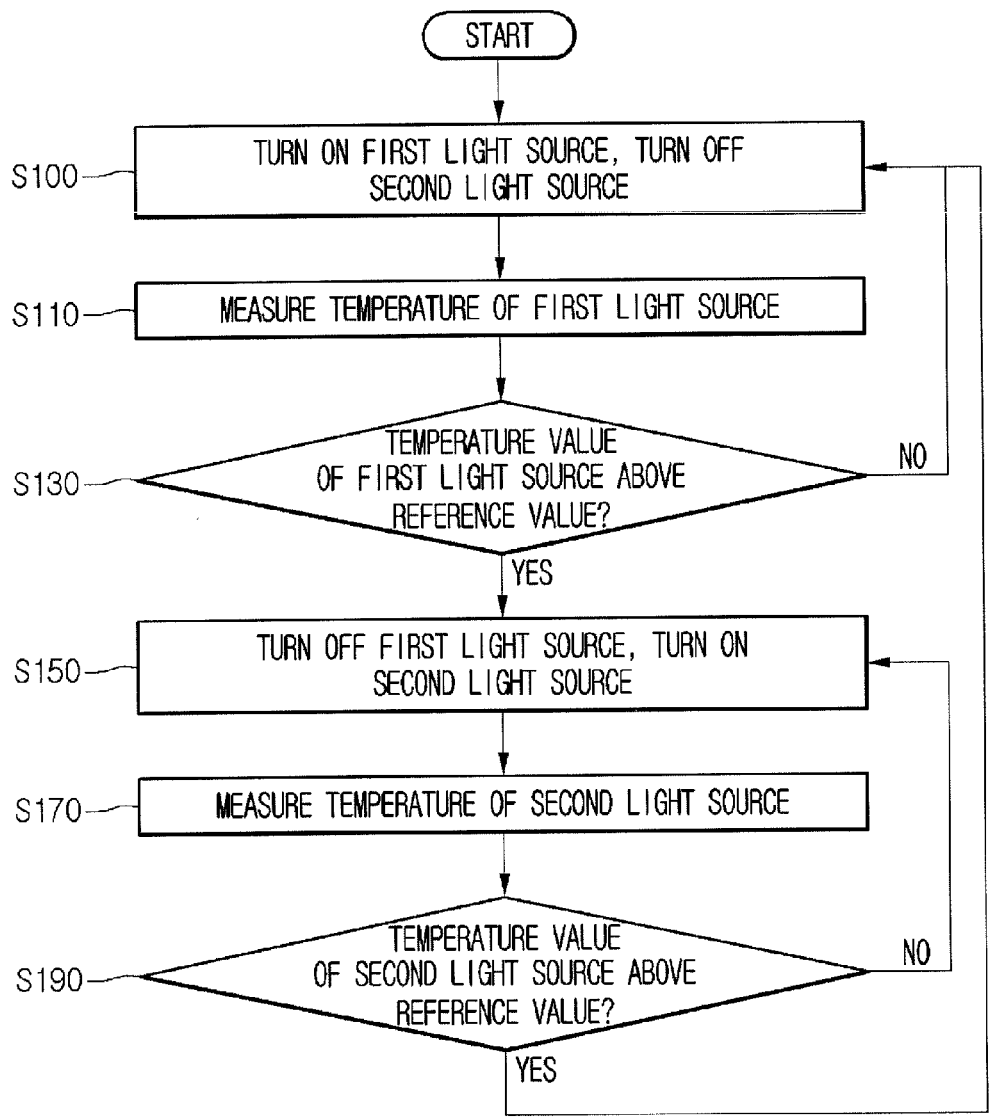
FIG. 4 is a flowchart illustrating a method of controlling a lighting device according to an embodiment.

FIG. 4 is a flowchart illustrating a method of controlling a lighting device according to an embodiment.

As shown in FIG. 4, when the projection system operates, the first light source 120 for projecting red light is turned on and the second light source 140 for projecting red light is turned off in operation S100. Here, the third light source 160 for projecting green light and the fourth light source 180 for projecting blue light may be turned on. That is, the red, green, and blue light sources 120, 160, and 180 operate normally and the additional second light source 140 for compensating a red color light source does not operate. The reason is that a phenomenon that the brightness of a light source is deteriorated by the heat therefrom occurs less at the beginning of the operation of the projection system.

As mentioned above, when the first light source 120 is turned on, the first temperature sensor 320 measures the temperature of the first light source 120 in operation S110. The temperature measurement may be performed in real-time according to a predetermined period.

Then, it is determined in operation S130 whether a temperature value of the first light source 120 increases above a reference value. Here, the reference value may be set by a pre-experimented data and may be a temperature at which the brightness of the red light source is maintained within a predetermined range, for example, 1° C. or 3° C.

If it is determined in operation S130 that the temperature value of the first light source 120 increases above the reference value, the first light source 120 is turned off and the second light source 140 for projecting the same red light as the first light source 120 is turned on in operation S150. That is, since it is expected that the brightness is deteriorated due to the temperature increase of the first light source 120, the first light source 120 is turned off and the second light source 140 is turned on, whose temperature is not increased because it does not start yet or a predetermined time elapses after it is turned off.

On the contrary, if the temperature value does not increase above the reference value, a current state in operation S100 is maintained.

As mentioned above, when the first light source 120 is turned off and the second light source 140 is turned on, the temperature of the second light source 140 is measured in operation 170. Here, after being turned on, the second temperature sensor 340 may continuously measure the temperature of the second light source 140 according to a predetermined period.

Then, it is determined in operation S190 whether the temperature of the second light source 140 increases above the reference value. If the temperature of the second light source 140 increases above the reference value, the second light source 140 is turned off and the first light source is turned on in operation S100. On the contrary, if the temperature of the second light source 140 does not increase above the reference value, a current state in operation S150 is maintained.

If examining closely, except the fact that the first and second light sources are turned on/off inversely, operation S100, operation S110, and operation S130 may correspond to operation S150, operation S170, and operation S190, respectively. If the temperature measurement value of one of the first and second light sources increases above the reference value, the other one operates. That is, after one of the first light source and the second light source projecting the same color as the first light source is turned on in operations S110 and S150, the temperature of the turned-on light source is measured in operations S110 and S170. If the temperature of the turned-on light source increases above the predetermined reference value in operations S130 and S190, the turned-off another light source is turned on in operation S100. The operations in this order may be repeated.

As mentioned above, the driver IC 400 alternately drives the first light source 120 and the second light source 140 according to their temperatures. This inhibits the brightness of the red light emitting diode from being deteriorated by heat, thereby inhibiting entire image quality deterioration.

Figure 5:
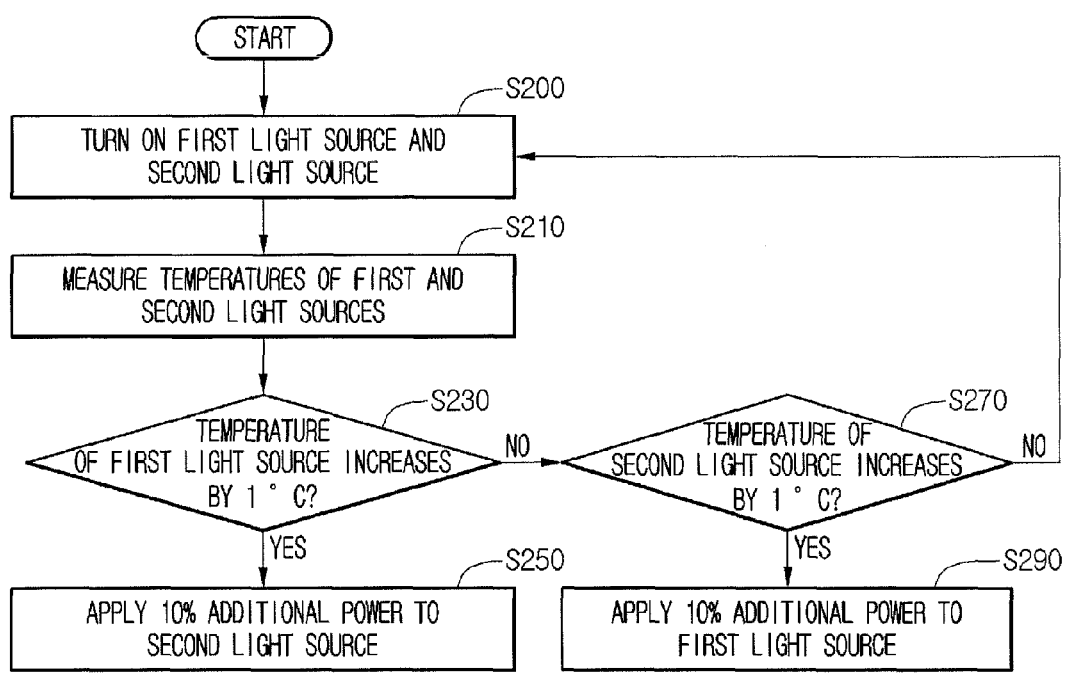
FIG. 5 is a flowchart illustrating a method of controlling a lighting device according to another embodiment.

FIG. 5 is a flowchart illustrating a method of controlling a lighting device according to another embodiment.

As shown in FIG. 5, when the projection system operates, the first light source 120 for projecting red light is turned on and the second light source 140 for projecting red light is turned on simultaneously in operation S200. Here, the distributed power, for example, 50% of the total power, may be applied to each of the first and second light sources 120 and 140. The control unit may apply a control signal to the driving unit 260 to adjust an amount of power supplied to the first and second light sources 120 and 140.

As mentioned above, when the first light source 120 and the second light source 140 are turned on, the temperature of each one is measured in operation 210. Here, the temperatures of the first and second light sources 120 and 140 may be measured by the first and second temperature sensors 320 and 340.

Then, it is determined in operation S230 whether the temperature of the first light source 120 increases by a predetermined temperature, for example, 1° C. If it is determined that the temperature of the first light source 120 increases by 1° C., 10% of the total power is additionally applied to the second light source 140 in operation S250.

On the contrary, if it is determined that the temperature of the first light source 120 does not increase by 1° C., it is determined in operation S270 whether the temperature of the second light source 140 increases by 1° C.

If it is determined that the temperature of the second light source increases by 1° C., 10% of the total power is additionally applied to the first light source 120 in operation S290. If the temperature of the second light source 140 does not drop, the current state (that is, 50% of the total power is applied to each of the first and second light sources 120 and 140) is maintained in operation S200.

Moreover, the temperature increases are determined in the order of the first light source 120 and the second light source 140, but the order may vary. For example, after it is determined whether the temperature of at least one of the first and second light sources 120 and 140 increases by a predetermined temperature, for example, 1° C., if there is one light source with a dropping temperature, a predetermined range, for example, 10%, of the total power, may be additionally applied to the other light source.

As mentioned above, the projection system differently applies power to and simultaneously drives the first light source 120 and the second light source 140 according to their temperatures. This inhibits the brightness of the red light emitting diode from being deteriorated by heat.

Although only the first and second light sources for projecting red light are controlled in the above description, it is apparent that light sources for projecting green or blue light may be also controlled for their uniform brightness according to their temperature values.

Moreover, although the two light sources for projecting red light are described above, it is apparent that more than three light sources may be used. However, since the driver IC has four channels for driving typical four light sources, two light sources for projecting the same color light may be effectively configured without additional expenses.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A projection system comprising:
   a red light emitting diode unit including a first red light emitting diode, a second red light emitting diode, a blue light emitting diode, and a green light emitting diode;
   a sensing unit for measuring a temperature of each of the first and second red light emitting diodes; and
   a driver IC for only driving the first red light emitting diode and the second red light emitting diode alternately according to a temperature value measured by the sensing unit,
   wherein the second red light emitting diode is driven when a temperature measurement value of the first red light emitting diode increases above a reference value.

2. The projection system according to claim 1, wherein the driver IC comprises:
   a control unit for selectively controlling the first red light emitting diode, the second red light emitting diode, the blue light emitting diode, and the green light emitting diode; and
   a driving unit for supplying power to the first red light emitting diode, the second red light emitting diode, the blue light emitting diode, and the green light emitting diode in response to a signal provided from the control unit.

3. The projection system according to claim 2, wherein the driver IC further comprises an A/D converter for converting a temperature measured by a temperature sensing unit into digital information.

4. The projection system according to claim 1, further comprising an image generating unit for generating a projected image by the first red light emitting diode, the second red light emitting diode, the blue light emitting diode, and the green light emitting diode.

5. A lighting device comprising:
   a red light emitting diode unit including a first red light emitting diode, a second red light emitting diode, a blue light emitting diode, and a green light emitting diode;
   a sensing unit for measuring a temperature of each of the first and second red light emitting diodes; and
   a driver IC for only driving the first red light emitting diode and the second red light emitting diode alternately according to a temperature value measured by the sensing unit,
   wherein the second red light emitting diode is driven when a temperature measurement value of the first red light emitting diode increases above a reference value.

6. A projection system comprising:
   a red light source unit including a first red light source, a second red light source, a blue light source, and a green light source;
   a sensing unit for measuring a temperature of each of the first and second red light sources; and
   a driver IC for driving the first red light source and the second red light source simultaneously according to a temperature value measured by the sensing unit,
   wherein 50% of a total power is applied to each of the first and second red light sources, and
   wherein, when a temperature of the first red light source increases by 1° C., 10% of power is additionally applied to the second red light source.

7. The projection system according to claim 1, wherein the driver IC has four channels for driving the first red light emitting diode, second red light emitting diode, blue light emitting diode, and green light emitting diode.

8. The projection system according to claim 1, further comprising a collimating lens,
   wherein a light of the first red, second red, blue, and green light emitting diodes is directly transferred to the collimating lens.

9. The projection system according to claim 8,
   wherein the collimating lens comprises first to third collimating lenses;
   wherein a light of the first and second red light emitting diodes is transferred to the first collimating lens.

* * * * *